US010560731B2

(12) United States Patent
Han et al.

(10) Patent No.: US 10,560,731 B2
(45) Date of Patent: Feb. 11, 2020

(54) SERVER APPARATUS AND METHOD FOR CONTENT DELIVERY BASED ON CONTENT-AWARE NEURAL NETWORK

(71) Applicant: KOREA ADVANCED INSTITUTE OF SCIENCE AND TECHNOLOGY, Daejeon (KR)

(72) Inventors: Dong Su Han, Daejeon (KR); Hyun Ho Yeo, Daejeon (KR); Seong Hyeon Do, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 15/924,637

(22) Filed: Mar. 19, 2018

(65) Prior Publication Data
US 2019/0215549 A1    Jul. 11, 2019

(30) Foreign Application Priority Data
Jan. 10, 2018  (KR) .................... 10-2018-0003377

(51) Int. Cl.
*H04N 21/25* (2011.01)
*G06K 9/66* (2006.01)
(Continued)

(52) U.S. Cl.
CPC ....... *H04N 21/251* (2013.01); *G06K 9/00718* (2013.01); *G06K 9/4628* (2013.01);
(Continued)

(58) Field of Classification Search
CPC ............. H04N 21/251; H04N 21/2668; H04N 21/23439; H04N 21/6125; H04N 21/6379;
(Continued)

(56) References Cited

U.S. PATENT DOCUMENTS 10,057,644 B1 *   8/2018  Farre Guiu .......... H04N 21/435
2003/0204718 A1 * 10/2003  Connelly .................. H04L 9/00
                                                           713/150
(Continued)

FOREIGN PATENT DOCUMENTS

KR   10-2011-0049570 A    5/2011
KR      10-1289758 B1     7/2013
KR   10-2017-0096298 A    8/2017

OTHER PUBLICATIONS

Yang et al., "Image Super-Resolution via Sparse Representation", IEEE Transactions on Image Processing, vol. 19, No. 11, Nov. 2010, p. 2861-2873.*

*Primary Examiner* — Benjamin R Bruckart
*Assistant Examiner* — Tien M Nguyen
(74) *Attorney, Agent, or Firm* — Sughrue Mion, PLLC

(57) ABSTRACT

The present disclosure provides a method and a server apparatus for delivering content based on content-aware using a neural network. A server apparatus for content delivery is provided, including a content clustering unit for clustering multiple contents provided from a content provider based on a similarity; a training unit for training a cluster-wise content reconstruction model by using contents contained in each cluster in accordance with a result of clustering performed by the content clustering unit; a storage unit for storing the multiple contents and the cluster-wise content reconstruction model; and a transmission unit for transmitting content requested by a user and a content reconstruction model corresponding to a cluster containing the content requested to a user terminal.

12 Claims, 9 Drawing Sheets

(51) Int. Cl.
*H04N 21/2343* (2011.01)
*G06K 9/00* (2006.01)
*H04N 21/61* (2011.01)
*H04N 21/2668* (2011.01)
*G06K 9/62* (2006.01)
*G06K 9/46* (2006.01)

(52) U.S. Cl.
CPC ......... *G06K 9/6218* (2013.01); *G06K 9/6274* (2013.01); *G06K 9/66* (2013.01); *H04N 21/23439* (2013.01); *H04N 21/2668* (2013.01); *H04N 21/6125* (2013.01); *G06K 2209/27* (2013.01)

(58) Field of Classification Search
CPC ......... H04N 21/23418; H04N 21/2343; H04N 21/2353; H04N 21/4356; H04N 21/4358; H04N 21/44; H04N 21/64784; H04N 21/64792; H04N 21/466; G06K 9/6218; G06K 9/66
See application file for complete search history.

(56) References Cited

U.S. PATENT DOCUMENTS

| | | | |
|---|---|---|---|
| 2004/0045030 A1* | 3/2004 | Reynolds | H04L 29/06 725/110 |
| 2011/0302236 A1* | 12/2011 | Shrum, Jr. | H04N 21/2343 709/203 |
| 2014/0169673 A1* | 6/2014 | Liu | G06F 17/30247 382/170 |
| 2015/0169632 A1* | 6/2015 | Tsai | G06F 17/30244 382/305 |
| 2016/0210534 A1* | 7/2016 | Padubrin | G06K 9/48 |
| 2017/0345130 A1* | 11/2017 | Wang | G06T 3/4046 |
| 2019/0082217 A1* | 3/2019 | Hertel | H04N 21/433 |

* cited by examiner

SERVER APPARATUS AND METHOD FOR CONTENT DELIVERY BASED ON CONTENT-AWARE NEURAL NETWORK

CROSS-REFERENCE TO RELATED APPLICATIONS

The present application is based on, and claims priority from, Korean Patent Application Number 10-2018-0003377, filed Jan. 10, 2018, the disclosure of which is incorporated by reference herein in its entirety.

TECHNICAL FIELD

The present disclosure in some embodiments relates to a server apparatus and a method for content delivery based on content-aware neural network.

BACKGROUND

The statements in this section merely provide background information related to the present disclosure and do not necessarily constitute prior art.

Internet Video delivery is dramatically increasing and a proportion of Internet video delivery in the entire Internet traffic is increasing due to streaming services that provide augmented reality (AR) or virtual reality (VR).

A variety of Internet video delivery technologies ranging from content network delivery networks (CDNs) to HTTP adaptive streaming and data-driven optimization for quality of experience (QoS) have been proposed to provide the best quality for users in limited network resources.

However, most of the Internet video delivery infrastructures are still treating a video content as a stream of bits, applying the same technologies to the video content irrespective of the type of content. In addition, practices for video encoding employs the use of signal processing techniques (e.g., discrete cosine transform and inter-frame prediction) based on spatial and temporal redundancies that occur at short time-scales (e.g. within a frame or a group of pictures).

SUMMARY

According to at least one embodiment of the present disclosure, a server apparatus for content delivery is provided including a content clustering unit, a training unit, a storage unit and a transmission unit. The content clustering unit clusters multiple contents provided from a content provider based on a similarity. The training unit trains a cluster-wise content reconstruction model by using contents contained in each cluster in accordance with a result of clustering performed by the content clustering unit. The storage unit stores the multiple contents and the cluster-wise content reconstruction model. The transmission unit transmits content requested by a user and a content reconstruction model corresponding to a cluster containing the requested content to a user terminal.

The apparatus according to at least one embodiment of the present disclosure may further include one or more of the following features.

The content clustering unit may cluster the multiple contents by determining the similarity by using a neural network-based image classification model.

The training unit may generate an alternative content by compressing the multiple contents and train the content reconstruction model so as to provide an original content from the alternative content.

The transmission unit may replace the requested content with the alternative content, and transmit the alternative content to the user terminal in accordance with a communication connection status of the user terminal.

According to another embodiment of the present disclosure, a method of performing content delivery to a user terminal by a content delivery server included in a content delivery system is provided, which includes clustering multiple contents provided from a content provider based on a similarity, training a cluster-wise content reconstruction model by using contents contained in each cluster in accordance with a result of the clustering of the multiple contents, and transmitting a content requested by a user and a content reconstruction model corresponding to a cluster containing the requested content to a user terminal.

REFERENCE NUMERALS

Figure 1:
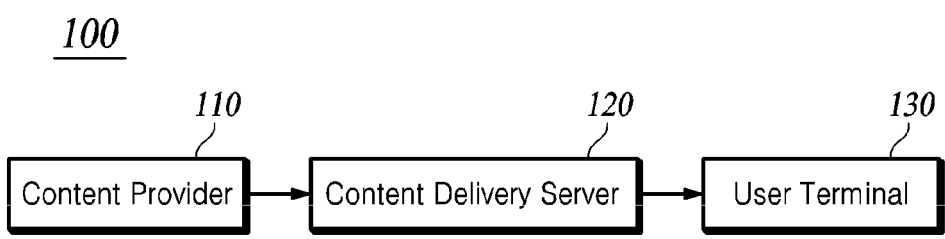
FIG. 1 is a schematic diagram of a content providing service system according to at least one embodiment of the present disclosure.

100: Content Providing Service System
110: Content Provider
120: Content Delivery Server
130: User Terminal

DETAILED DESCRIPTION

Embodiments of the present disclosure seek to provide a content-aware content delivery server apparatus based on a neural network, which apparatus is capable of delivering content to a user terminal in accordance with the characteristics of individual content, and a method thereof.

Hereinafter, some embodiments of the present disclosure will be described in detail with reference to the accompanying drawings. In the following description, like reference numerals designate like elements, although the elements are shown in different drawings. Further, in the following description of the at least one embodiment, a detailed description of known functions and configurations incorporated herein will be omitted for the purpose of clarity and for brevity.

Additionally, various terms such as first, second, A, B, (a), (b), etc., are used solely for the purpose of differentiating one component from the other, but not to imply or suggest the substances, the order or sequence of the components. Throughout this specification, when a part "includes" or "comprises" a component, the part is meant to further include other components, not excluding thereof unless specifically stated to the contrary. Further, the terms such as "unit", "module", and the like refer to units for processing at least one function or operation, which may be implemented by hardware, software, or a combination thereof.

Hereinafter, some embodiments of a method and a server apparatus for content delivery based on content-aware neural network of the present disclosure will be described with reference to the accompanying drawings.

Throughout this specification, a content includes a variety of multimedia contents such as broadcasting contents, audio or video contents and the like. Content may be any digital content, such as, but not limited to, text, images, video, audio, multimedia or any combination thereof. Therefore, content includes not only content produced by content production companies, but also user created content (UCC) that is produced and distributed by individuals.

Throughout this description, metadata refers to data that provide information about content. Metadata is recorded on a manifest file and transmitted to a user terminal, and the user terminal can be provided with content services, such as requesting the content by utilizing the metadata.

FIG. 1 is a schematic diagram of a content providing service system according to at least one embodiment of the present disclosure.

Referring to FIG. 1, a content providing service system according to at least one embodiment of the present disclosure includes a content provider 110, a content delivery server 120 and a user terminal 130.

The content provider 110 generates and provides content for content providing services. The content provider 110 may generate various content according to its service items.

For example, a content provider that provides a video-on-demand (VOD) service may generate and provide video/audio content, and a content provider that provides a personal broadcasting service may generate and provide a live stream content. Further, a content provider that provides a multi-angle image sharing service may generate and provide a content containing depth information of images. Further, a content provider that provides an augmented reality (AR) service may generate and provide a content which is stitched by a 360° camera.

The content delivery server 120 transmits content provided by the content provider 110 to the user terminal 130 using a protocol suitable for service and content. The content delivery server 120 selects an appropriate method for delivering content to the user terminal 130, and transmits content provided by the content provider 110 to the user terminal 130 using the selected appropriate method. The content delivery server 120 may continually receive a new content that is generated and provided by the content provider 110 and transmit the same to the user terminal 130.

For example, a VOD content provided by the content provider may be transmitted using a real-time streaming protocol (RTSP) in order to provide a VOD service, while an individual broadcasting content may be transmitted using an HTTP live streaming (HLS) protocol or moving picture experts group-transport stream (MPEG-TS) protocol in order to provide an individual broadcasting content provided by the content provider.

Further, the content delivery server 120 classifies multiple contents provided by the content provider 110 into clusters based on a similarity and generates a cluster-wise content reconstruction model by using the contents contained in each cluster. The content reconstruction model is a neural network-based model that is trained to provide a high-resolution or high-quality content from a low-resolution or compressed content. The content reconstruction model may be trained to provide a high-resolution image from a low-resolution image, or to reconstruct an original image from a black-and-white or outline image. Also, the content reconstruction model may provide a high-quality image containing an interpolated frame from a compressed image by learning inter-frame interpolation.

To cluster the multiple contents, the content delivery server 120 may use metadata of content provided by the content provider 110, or may use the deep neural networks (DNNs) for image classification. Specifically, the content delivery server 120 may cluster the multiple contents, by determining a similarity of each content through the DNNs for image classification.

The content delivery server 120 may train a content reconstruction model to output a high-resolution or high-quality content from a low-quality or compressed content, using multiple contents of each cluster. The contents contained in a cluster share large redundancy, and therefore, each of the contents contained in the same cluster can use the same content reconstruction model.

The user terminal 130 receives content provided by the content provider 110 and a content reconstruction model, via the content delivery server 120. The user terminal 130 may be any of smartphone, tablet PC, laptop, desktop, etc. And an appropriate model for content delivery can be provided to the user terminal 130 in accordance with the type of the user terminal 130.

The content reconstruction model may be contained in metadata of the manifest file that the user terminal 130 receives. The user terminal 130 may request a content or an access to a content and receive a content reconstruction model that matches the corresponding content.

The user terminal 130 may generate content having desired quality by using a received content and the content reconstruction model. In other words, a user can be provided with content of high quality even if a network connection is not good condition, because the user terminal 130 can generate content of high quality by using the provided content reconstruction model.

The user terminal 130 receives content and a respective content reconstruction model corresponding to the content by using a transmission protocol with which the content type for service is compatible. For example, the user terminal 130 can receive a content by using an RTSP or HLS protocol for a VOD service and receive a live stream content by using an HLS or MPEG-TS protocol for an individual broadcasting service.

Figure 2:
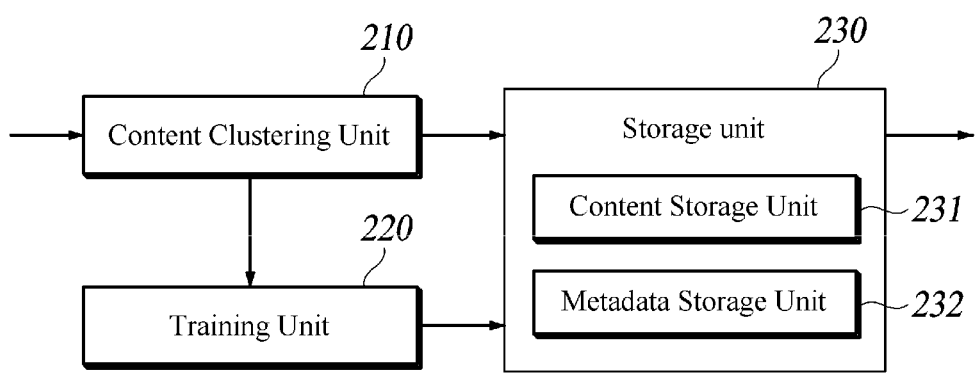
FIG. 2 is a schematic diagram of a content delivery server according to at least one embodiment of the present disclosure.

FIG. 2 is a schematic diagram of a content delivery server according to at least one embodiment of the present disclosure.

Referring to FIG. 2, the content delivery server 120 according to at least one embodiment of the present disclosure includes a content clustering unit 210, a training unit 220 and a storage unit 230, wherein the storage unit 230 includes a content storage unit 231 and a metadata storage unit 232. Each of the components illustrated in FIG. 2 can be implemented with a hardware chip, or implemented with software while a microprocessor is implemented to execute a function of the software, where each function corresponds to each of the components.

The content clustering unit 210 clusters multiple contents provided by a content provider based on a similarity. To cluster multiple contents, the content clustering unit 210 may use metadata of content provided by the content provider 110, or machine learning-based model that determines a similarity of an image. Specifically, the content clustering unit 210 clusters the multiple contents by determining a similarity of content using a neural network model that has been trained to learn image classification.

For instance, in the case of a variety of sports-related images are provided from the content provider 110, they may be clustered into datasets such as a basketball game, soccer game, baseball game and the like, by analyzing metadata of each content provided by the content provider 110. Or, they may also be clustered based on a similarity into datasets such as a basketball game, soccer game, baseball game, and the like, through analysis of a frame of each image using a DNNs for image classification.

When the content clustering unit 210 receives a new content from the content provider 110, it determines a similarity of the new content with an existing cluster by using the image classification model. If it is determined that the new content shares a highest similarity with any of the existing clusters, the content clustering unit 210 clusters the new content into the cluster which the new content shares the highest similarity with. Or, the content clustering unit 210 clusters the new content into a new cluster if a similarity of the new content with any of the existing clusters is determined to be less than or equal to a predetermined level.

The training unit 220 trains a cluster-wise content reconstruction model by using multiple contents included in each cluster. The content reconstruction model is a neural network-based model that is trained to provide a high-resolution or high-quality content from a low-resolution or compressed content. The content reconstruction model may be trained to provide a high-resolution image from a low-resolution image, or to reconstruct an original image from a black-and-white or outline image. Also, the content reconstruction model may provide a high-quality image containing an interpolated frame from a compressed image by learning inter-frame interpolation.

The training unit 220 may train the content reconstruction model to output a high-resolution or high-quality content from a low-quality or compressed content, by using the content that shares a high degree of similarity to one another. The contents contained in a cluster share large redundancy, and therefore, each of the contents included in the same cluster can use the same content reconstruction model.

For example, in the case of a soccer game image, background such as stadium, players, and the like, show up repeatedly throughout the video, and the same background and players can show up in a series of soccer game videos. Further, even if the soccer stadium or players aren't same, there is much redundant information shared in many different soccer game videos such as the color of the lawn of the stadium, or audience and the like that appear in the foreground. Therefore, once the clustering of the similar contents and training of the content reconstruction model by using the similar contents are completed, excellent content reconstruction performance that is applicable to a variety of sports game videos can be achieved, and thus, all of the sport game videos contained in the cluster can share the corresponding content reconstruction model.

The training unit 220 generates a content reconstruction model that corresponds to the content contained in a respective cluster by using a neural network such as a convolutional neural network that is suitable for image processing. The training unit 220 associates a cluster-wise content reconstruction model with the contents contained in the cluster, and records association information metadata on a manifest file. The training unit 220 generates a low-quality or compressed content (referred as to "alternative content" hereinafter) in accordance with trained information on the content reconstruction model, and records the alternative content in the manifest file. In other words, the manifest file may include the content reconstruction model and the alternative content.

If content reconstruction model is trained without clustering content, the cost for computation tends to enormously increase and the content reconstruction performance for each content may not be uniform. Therefore, according to this embodiment of the present disclosure, not only the cost for the computation will decrease, but also the content reconstruction performance will be improved, through the clustering multiple contents based on relative similarities and through the generating content reconstruction models that have been trained separately for each cluster by using contents contained in the cluster The storage unit 230 stores multiple contents and a cluster-wise content reconstruction model. The content storage unit 231 stores content received from the content provider 110. The stored content may be an original content file, or an alternative content. The metadata storage unit 232 stores metadata which is related to the content.

Although not illustrated in FIG. 2, the content delivery server 120 further includes a transmission unit that transmits a content reconstruction model corresponding to a content requested by a user and a cluster where the requested content is contained to a user terminal. The transmission unit (not illustrated herein) may transmit the original requested content or an alternative content along with the content reconstruction model by considering the communication connection status.

Figure 3:
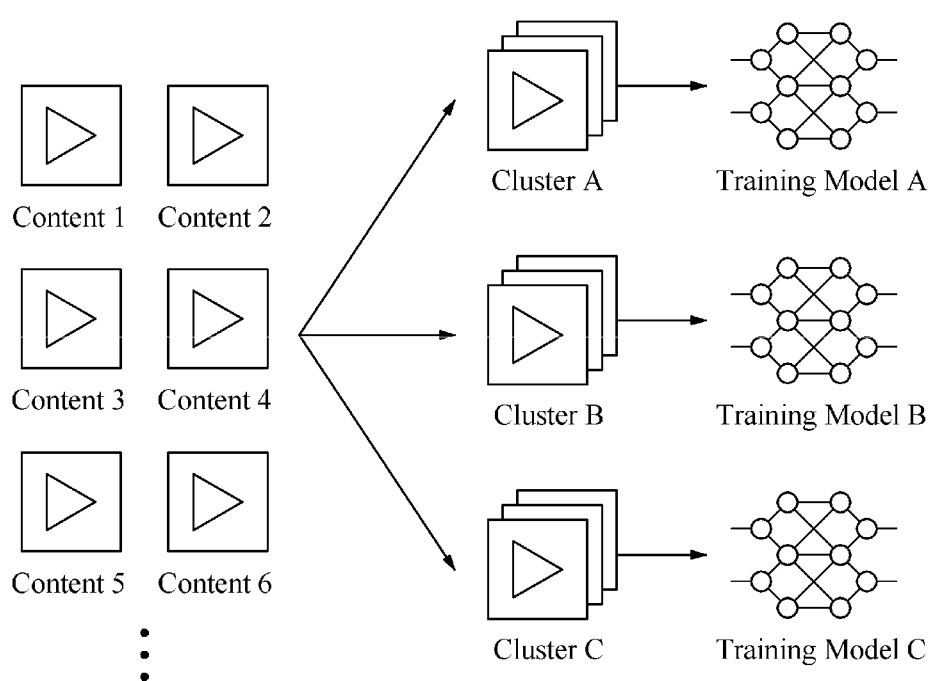
FIG. 3 is a diagram of a method of training a content reconstruction model in a content delivery server according to at least one embodiment of the present disclosure.

FIG. 3 is a diagram of a method of training a content reconstruction model in a content delivery server according to at least one embodiment of the present disclosure.

Figure 4:
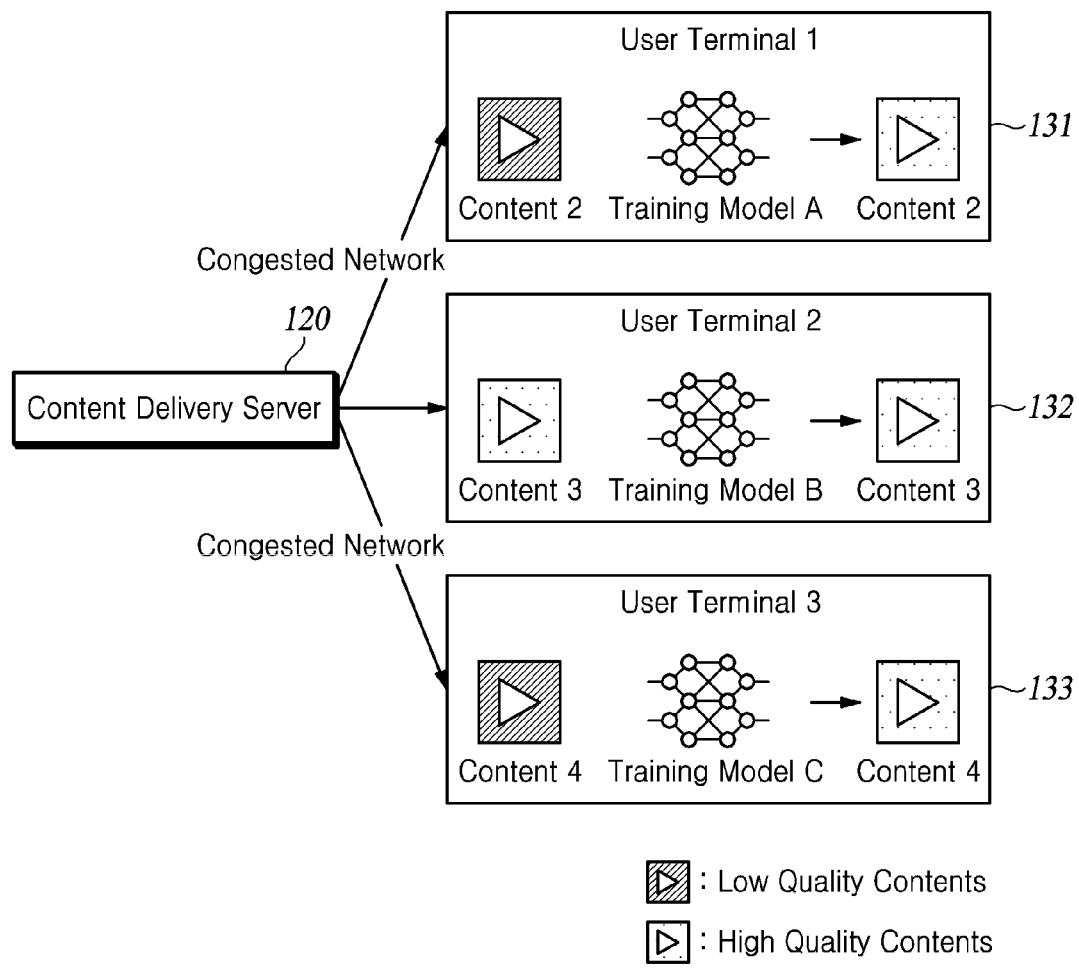
FIG. 4 is a diagram of a method of content delivery using a cluster-wise content reconstruction model according to at least one embodiment of the present disclosure.

FIG. 4 is a diagram of a method of content delivery using a cluster-wise content reconstruction model according to at least one embodiment of the present disclosure.

The content delivery server 120 clusters multiple contents based on similarities between the multiple contents. In order to cluster the multiple contents, the content delivery server 120 may use metadata provided along with the content by the content provider 110, or a machine learning-based model that determines a similarity of images.

The content reconstruction model is generated for each cluster. Since each cluster contains multiple contents that are similar to one another, the content reconstruction model can be shared within each cluster. The content reconstruction model is a neural network-based model that is trained to provide a high-resolution or high-quality content from a low-resolution or compressed content. The content reconstruction model may be trained to provide a high-resolution image from a low-resolution image, or to reconstruct an original image from a black-and-white or outline image. Also, the content reconstruction model may provide a high-quality image containing an interpolated frame from a compressed image by learning inter-frame interpolation.

For example, provided that cluster A, cluster B and cluster C that are related to a soccer game, a basketball game and a baseball game, respectively, training model A is a content reconstruction model which has been trained to learn soccer game of which contents contained in cluster A, training model B is a content reconstruction model which has been trained to learn basketball game, and training model C is a content reconstruction model which has been trained to learn baseball game, respectively.

Referring to FIG. 4, the content delivery server 120 transmits a content reconstruction model along with a content bound for a user terminal. It is assumed that a network connection between 'user terminal 1' 131 and 'user terminal 3' 133 is congested, and traffic between 'user terminal 1' 131 and 'user terminal 2' 132 is in good condition.

When a network connection between 'user terminal 1' 131 and 'user terminal 3' 133 is congested, a content reconstruction model and an alternative content are transmitted. And 'user terminal 1' 131 and 'user terminal 3' 133 compute to generate a high-quality content. Further, as traffic between 'user terminal 1' 131 and 'user terminal 2' 132 is in a good condition, a high-quality content can be directly transmitted by the content delivery server 120 and also in this case, an alternative content and a content reconstruction model can be transmitted.

Figure 5:
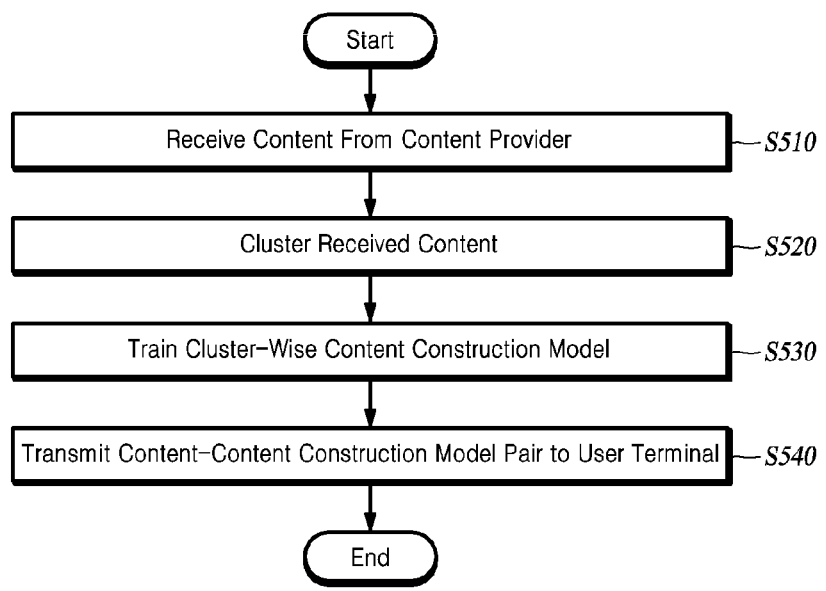
FIG. 5 is a flowchart of a method of content delivery performed by a content delivery server according to at least one embodiment of the present disclosure.

FIG. 5 is a flowchart of a method of content delivery performed by a content delivery server according to at least one embodiment of the present disclosure.

The content delivery server receives content from the content provider (S510). The content includes a variety of multimedia content such as broadcasting content, audio/video content and the like.

The content delivery server clusters a received content (S520). Clustering of the multiple contents provided by the content provider is performed based on similarities. To cluster the multiple contents, either metadata of the content provided by the content provider or a machine learning-based model which determines a similarity of images can be used.

The content delivery server trains a cluster-wise content reconstruction model (S530). By using contents contained in each cluster with a high degree of similarity, the content reconstruction model can be trained to provide a high-resolution or high-quality content from a low-quality or compressed content by using the content that shares a high degree of similarity to one another. The multiple contents contained in a cluster share large redundancy, and therefore, each of the contents contained in a cluster can use the same content reconstruction model.

When content is requested by a user, a content-content reconstruction model pair is transmitted to a user terminal (S540). Herein, the transmitted content may be an alternative content or original content, which is determined in accordance with a network connection status. A content reconstruction model may be contained in the metadata of a manifest file received by the user terminal. The user terminal can request content or an access to content and receive a content reconstruction model that matches the corresponding content.

Hereinafter, implementation of a content reconstruction model according to at least one embodiment of the present disclosure and a method for content delivery using the same are described in detail.

1. High-Resolution Reconstruction

Super-resolution imaging (SR) is a technique to improve an image resolution which allows of a reconstruction of an image from a low-resolution image to a high-resolution image. Such technique of improving image resolution using content reconstruction model can be an alternative to an adaptive streaming technique, and allows of providing an image having stable and improved quality.

As a content reconstruction model, a deep convolution neural network is used to perform super-resolution imaging reconstruction. To generate a content-aware neural network model, episodes from a series were used as a training data. More specifically, four datasets were used including a basketball game from the 2012 London Olympics available on YouTube, 100-m and 200-m men's final from the 2012 London Olympics available on YouTube, a multiple plays of a computer game (StarCraft), and the Conan monologue episodes from the official YouTube channel of Late Night host Conan O'Brien. For basketball, the first half of the game was used as a training video, and the second half was used as a testing video. For the rest of the datasets, one video in the series was used for training, and another was used for testing.

A content-agnostic DNN which had been trained to learn a benchmark data set used for super-resolution imaging reconstruction irrespective of similarities was used as a neural network model for comparison, and a method of reconstructing a resolution of an image through the use of a interpolation was used as a minimum performance reference.

Figure 6:
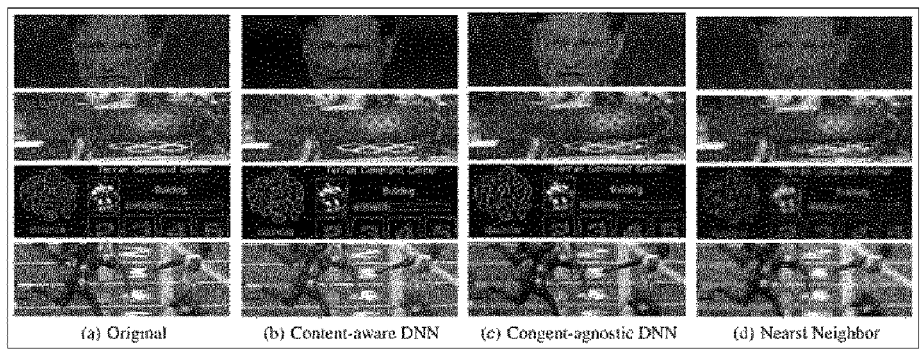
FIG. 6 is a diagram showing video quality improvement results comparing a method according to at least one embodiment of the present disclosure with a conventional technology.

FIG. 6 is a diagram showing video quality improvement results comparing a method according to at least one embodiment of the present disclosure with a conventional technology.

In FIG. 6, (a) shows an original video, (b) shows the case that a content reconstruction model according to at least one embodiment of the present disclosure, (c) shows the case that a conventional VDSR model, and (d) shows a super-resolution video obtained through the use of interpolation. As shown in FIG. 6, according to at least one embodiment of the present disclosure, enhanced performance of image quality improvement can be achieved by classifying multiple contents based on similarities and by learning a resolution reconstruction technique. Specifically, referring to the case of the reconstructed game screen in FIG. 6, it is shown that a text can be excellently reconstructed according to at least one embodiment of the present disclosure.

FIG. 7A, FIG. 7B, FIG. 8A and FIG. 8B are diagrams showing video delivery performance comparing a method according to at least one embodiment of the present disclosure with a conventional technology.

Figure 7A:
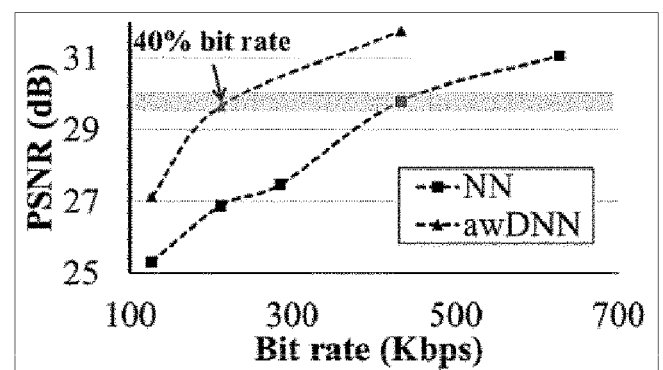
FIG. 7A, FIG. 7B, FIG. 8A and FIG. 8B are diagrams showing video delivery performance comparing a method according to at least one embodiment of the present disclosure with a conventional technology.
Figure 7B:
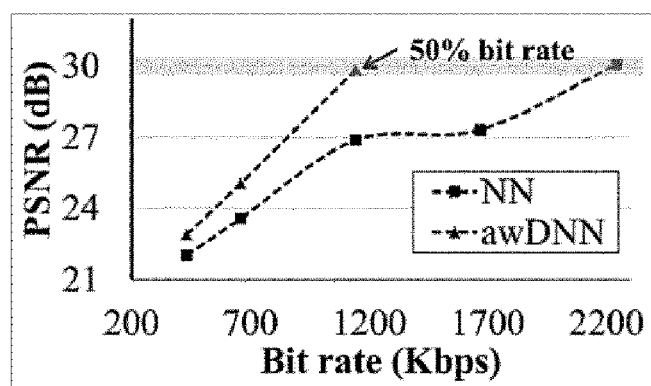

FIG. 7A and FIG. 7B show the relationship between bitrate and quality of video delivery. More specifically, as shown in FIG. 7B, a content-aware content reconstruction model delivering an 1.1 Mbps video shows better quality compared to the conventional interpolation technique delivering a 2.2 Mbps video, and accordingly, over 50% reduction in network bandwidth can be achieved when using the method according to at least one embodiment of the present disclosure. In other words, a video with high quality can be delivered using smaller network bandwidth according to at least one embodiment of the present disclosure.

Figure 8A:
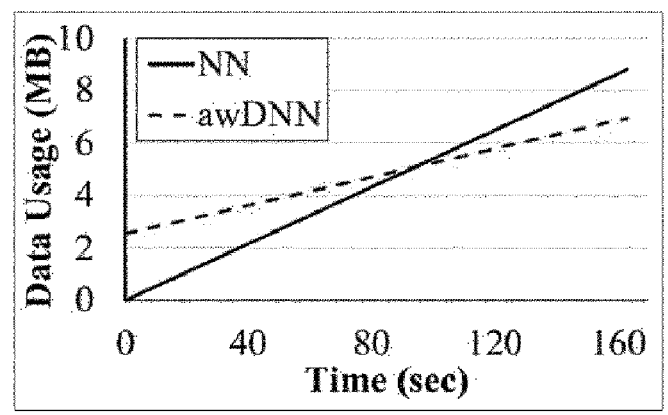
Figure 8B:
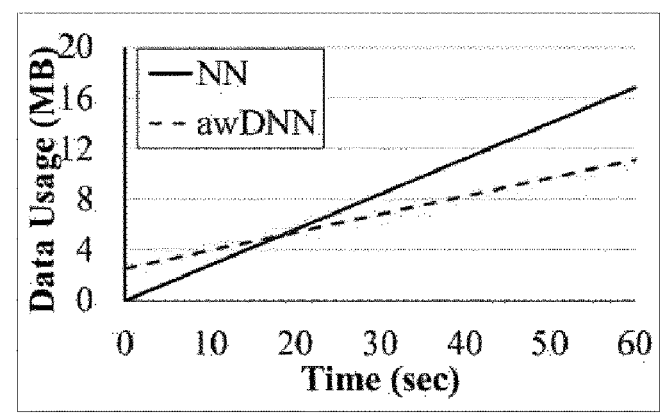

FIG. 8A and FIG. 8B show the overall data usage when delivering a video having the same quality. The size of a neural network-based content reconstruction model according to at least one embodiment of the present disclosure is 7.8 MB. The size of a content reconstruction model may vary with parameter settings of a neural network. As the number of parameters of a neural network increases, the reconstruction performance becomes better while causing the size of the content reconstruction model to be greater. The cost for transferring the content reconstruction model according to at least one embodiment of the present disclosure can be compensated within 2 minutes and 20 seconds referring to FIG. 8A and FIG. 8B, respectively.

As shown in the FIG. 8A and FIG. 8B, according to at least one embodiment of the present disclosure, once the initial content reconstruction model is delivered, a user terminal whose user watches similar content can more efficiently reconstruct an alternative content through the use of the same reconstruction model. Further, due to its short loading time for loading parameters, the user terminal does not require an extended period of time to initialize a training model, and therefore, needs a shorter period of time to reconstruct a high-resolution image.

2. Original Image Reconstruction

Generative adversarial networks (GANs) refer to a neural network capable of synthesizing an image that is indistinguishable from a real image. Through the use of such GANs, a high-quality video can be generated from a video that contains less redundancy. Hereinafter, LUM which represents data only containing the luminance (Y) from the original video through the removal of chroma in YCbCr color space and EDGE which produces a black-and-white image using 1-bit quantization through the extraction of contours of objects based on an edge detection algorithm for each frame will be described.

Figure 9:
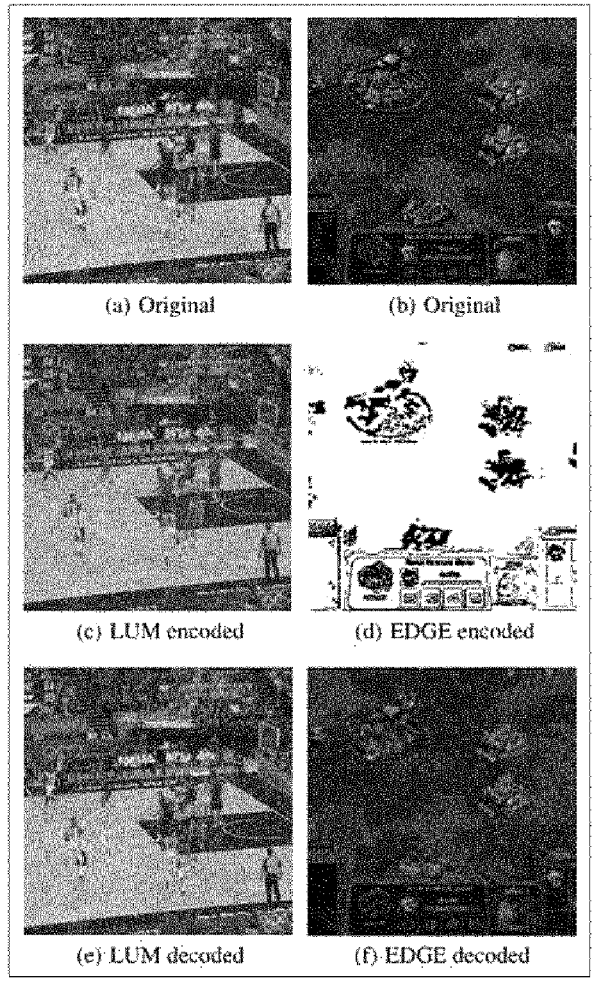
FIG. 9 is a diagram showing video encoding and decoding performance comparing a method according to at least one embodiment of the present disclosure with a conventional technology.

FIG. 9 is a diagram showing video encoding and decoding performance comparing a method according to at least one embodiment of the present disclosure with a conventional technology.

FIG. 9 shows at (a) and (b) example frames for LUM and EDGE applied in a basketball game and computer game (StarCraft), respectively. FIG. 9 shows that far less amount of information is contained in LUM and EDGE, compared to the original image. In this embodiment, a GAN network is trained based on videos contained in a dataset to produce the original images from LUM and EDGE. For example, for LUM, the network synthesizes the original form (including chroma) from luminance values. Images made based on LUM and EDGE are compared with JPEG images having similar quality.

The result shows that LUM (20.33 kB) delivers a similar quality image using data less than 11% compared to JPEG (22.84 kB). FIG. 9 at (e) shows a reconstructed image of LUM. The generated color is nearly the same as the original. It can be concluded that Chroma is an element of which redundancy can be well trained by such a neural network-based training model, and can show excellent reconstruction performance when used according to at least one embodiment of the present disclosure for a process of video delivery.

EDGE (3.65 kB) uses less data for delivering a similar quality image than JPEG (9.29 kB). FIG. 9 at (f) shows a decoded image by using such EDGE. Except some distortion of the object's outline, the generated color of the image well matches with the original. This means that a black-and-white image defined by outlines has enough information to reconstruct an original image when long-term redundancy exists in a video.

3. Frame Interpolation

Frame interpolation using a deep neural network shows better performance compared to a signal processing-based frame interpolation. Therefore, a content reconstruction model according to at least one embodiment of the present disclosure learns frame interpolation on content, it generates a frame-compressed content as an alternative content and provides content having less artifacts, thereby showing more natural look compared to a conventional signal processing-based frame interpolation technique.

Although exemplary embodiments of the present disclosure have been described for illustrative purposes, those skilled in the art will appreciate that various modifications, additions and substitutions are possible, without departing from the idea and scope of the claimed invention. The scope of the technical idea of the present embodiments is not limited by particular illustrations. Accordingly, one of ordinary skill would understand the scope of the claimed invention is not to be limited by the explicitly described above embodiments but by the claims and equivalents thereof.

The method described in FIG. 5 can be implemented as a computer program, and can be recorded on a computer-readable medium. The computer-readable recording medium on which the method of content delivery according to some embodiments is recordable includes any type of recording device on which data that can be read by a computer system are recordable. Examples of the computer-readable recording medium include a ROM, a RAM, a CD-ROM, a magnetic tape, a floppy disk, an optical data storage device, and the like, and also include one implemented in the form of a carrier wave (e.g., transmission through the Internet). Further, the computer-readable recording medium can be distributed in computer systems connected via a network, and computer-readable codes can be stored and executed in a distributed mode. Moreover, functional programs, codes, and code segments for implementing some embodiments can be easily deduced by a programmer in technical fields to which some embodiments belong.

According to at least one embodiment of the present disclosure, a network bandwidth for content delivery can be reduced while delivering a high-quality content to a user by clustering similar contents and training a content reconstruction model using similarities between the contents.

According to another aspect of at least one embodiment of the present disclosure, a content with a quality desired by a user can be provided by realizing content reconstruction performance, by providing a content reconstruction model to a user terminal, causing the user terminal to use its computational power.

What is claimed is:

1. A server apparatus for content delivery, comprising:
   a content clustering unit, implemented by one or more processors, configured to cluster a plurality of contents provided from a content provider by using metadata of the plurality of contents based on a similarity;
   a training unit, implemented by the one or more processors, configured to train a cluster-wise content reconstruction model by using contents contained in each cluster in accordance with a result of clustering performed by the content clustering unit, and configured to record an association between the cluster-wise content reconstruction model and the contents in each cluster on association information metadata of a manifest file;
   a content storage unit, implemented by a hardware chip, configured to store the plurality of contents and a corresponding cluster-wise content reconstruction model; and
   a transmission unit, implemented by the one or more processors, configured to transmit the manifest file to a user terminal, a content reconstruction model corresponding to the cluster containing the plurality of contents being contained in metadata of the manifest file received by the user terminal, and in response to a request for a content from the user terminal by utilizing the metadata of the manifest file, transmit, to the user terminal, the content and the content reconstruction model corresponding to the cluster containing the content, wherein the transmission unit is configured to transmit an original content to the user terminal in accordance with a communication connection status in good condition, and transmit an alternative content to the user terminal in accordance with a communication connection status in congested condition for the user terminal so as to compute to generate a high-quality content by using the alternative content and the content reconstruction model, the alternative content being generated by compressing the original content, and wherein the content clustering unit is configured to, responsive to a new content from the content provider for determining a similarity of the new content with existing clusters, cluster the new content into a cluster that shares a largest redundancy with the new content, and cluster the new content into a new cluster when the similarity is determined to be the same or less than a predetermined level.

2. The server apparatus for content delivery of claim 1, wherein the content clustering unit is further configured to cluster the plurality of contents based on determining the similarity through the use of a neural network-based image classification model.

3. The server apparatus for content delivery of claim 1, wherein the training unit is configured to train the content reconstruction model so as to provide the original content from the alternative content.

4. The server apparatus for content delivery of claim 3, wherein the training unit is configured to generate a low-resolution image contained in the cluster and train the content reconstruction model to provide an original image from the low-resolution image.

5. The server apparatus for content delivery of claim 3, wherein the training unit is configured to extract a luminance image or a contour image contained in the cluster, and to train the content reconstruction model so as to provide the original content from the luminance image or the contour image.

6. The server apparatus for content delivery of claim 3, wherein the training unit is configured to train the content reconstruction model so as to learn a frame interpolation on the contents contained in the cluster.

7. The server apparatus for content delivery of claim 3, wherein the transmission unit is configured to replace the content requested with the alternative content, and transmit the alternative content to the user terminal in accordance with the communication connection status in congested condition of the user terminal.

8. The server apparatus for content delivery of claim 1, further comprising a metadata storage unit, implemented by a second hardware chip, configured to store the metadata which is related to the plurality of contents.

9. A method of performing content delivery by a content delivery server included in a content delivery system, the method comprising:

clustering a plurality of contents provided from a content provider by using metadata of the plurality of contents based on a similarity;

training a cluster-wise content reconstruction model by using contents contained in each cluster in accordance with a result of the clustering of the plurality of contents;

recording an association between the cluster-wise content reconstruction model and the contents in each cluster on association information metadata of a manifest file;

transmitting the manifest file to a user terminal, a content reconstruction model corresponding to the cluster containing the plurality of contents being contained in metadata of the manifest file received by the user terminal, and in response to a request for a content from the user terminal by utilizing the metadata of the manifest file, transmit, to the user terminal, the content and the content reconstruction model corresponding to the cluster containing the content, and transmitting an original content to the user terminal in accordance with a communication connection status in good condition, and transmitting an alternative content to the user terminal in accordance with a communication connection status in congested condition for the user terminal so as to compute to generate a high-quality content by using the alternative content and the content reconstruction model, the alternative content being generated by compressing the original content, wherein the clustering of the plurality of contents comprises: responsive to a new content from the content provider for determining a similarity of the new content with existing clusters, clustering the new content into a cluster that shares a largest redundancy with the new content, and clustering the new content into a new cluster when the similarity is determined to be the same or less than a predetermined level.

10. The method of claim 9, wherein the clustering of the plurality of contents comprises:

clustering the plurality of contents by determining the similarity based on a neural network-based image classification model.

11. The method of claim 9, wherein the training of the cluster-wise content reconstruction model comprises:

training the content reconstruction model so as to provide the original content from the alternative content.

12. The method of claim 11, wherein the transmitting of the content requested by the user terminal comprises:

replacing the content requested with the alternative content, and transmitting the alternative content to the user terminal in accordance with the communication connection status in congested condition the user terminal.

* * * * *